No. 698,908. Patented Apr. 29, 1902.
F. DODGE.
CLOTH CUTTING MACHINE.
(Application filed Sept. 7, 1901.)
(No Model.) 3 Sheets—Sheet 1.

WITNESSES INVENTOR

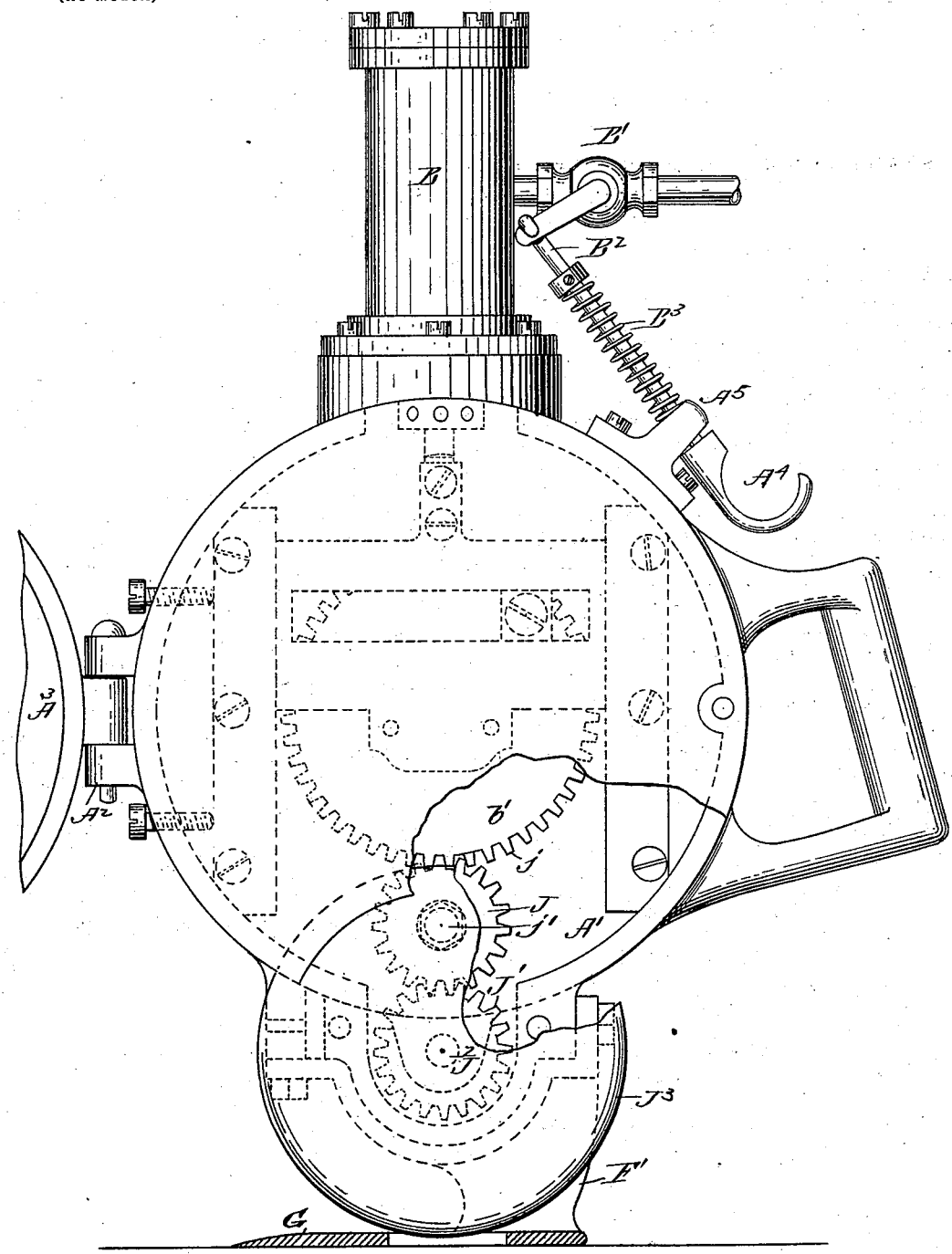

UNITED STATES PATENT OFFICE.

FRANK DODGE, OF BOSTON, MASSACHUSETTS.

CLOTH-CUTTING MACHINE.

SPECIFICATION forming part of Letters Patent No. 698,908, dated April 29, 1902.

Application filed September 7, 1901. Serial No. 74,642. (No model.)

*To all whom it may concern:*

Be it known that I, FRANK DODGE, of Boston, in the county of Suffolk and State of Massachusetts, have invented a new and useful Improvement in Cloth-Cutting Machines, of which the following is a specification.

My invention is of that character intended to be used to cut many thicknesses of cloth at once. For certain kinds of cloth it is better that a vertically-reciprocating cutter should be used and for others that a rotary cutter should be used, and to avoid duplicating machines unnecessarily it is desirable that the same machine be provided with means whereby it may be supplied with either form of knife.

My invention therefore consists in a machine having this interchangeable characteristic.

My invention consists in a cutting-machine adapted to be run, preferably, by compressed air having a cylinder and piston and connecting mechanism of peculiar character, whereby a balance-wheel is combined with the knife, so as to give to the reciprocations of the knife a positive movement which shall be substantially regular both in speed and power at all portions of its stroke and accomplishing this result by such connections that the knife operated thereby is subjected to but little frictional heat. The advantage of being able to run a cutter of this class by compressed air is apparent when it is considered that a gang of such cutters can be arranged, each taking its supply of air from a common pipe running from a suitable reservoir supplied by an air-pump.

My invention will be understood by reference to the drawings, in which—

Figure 1:
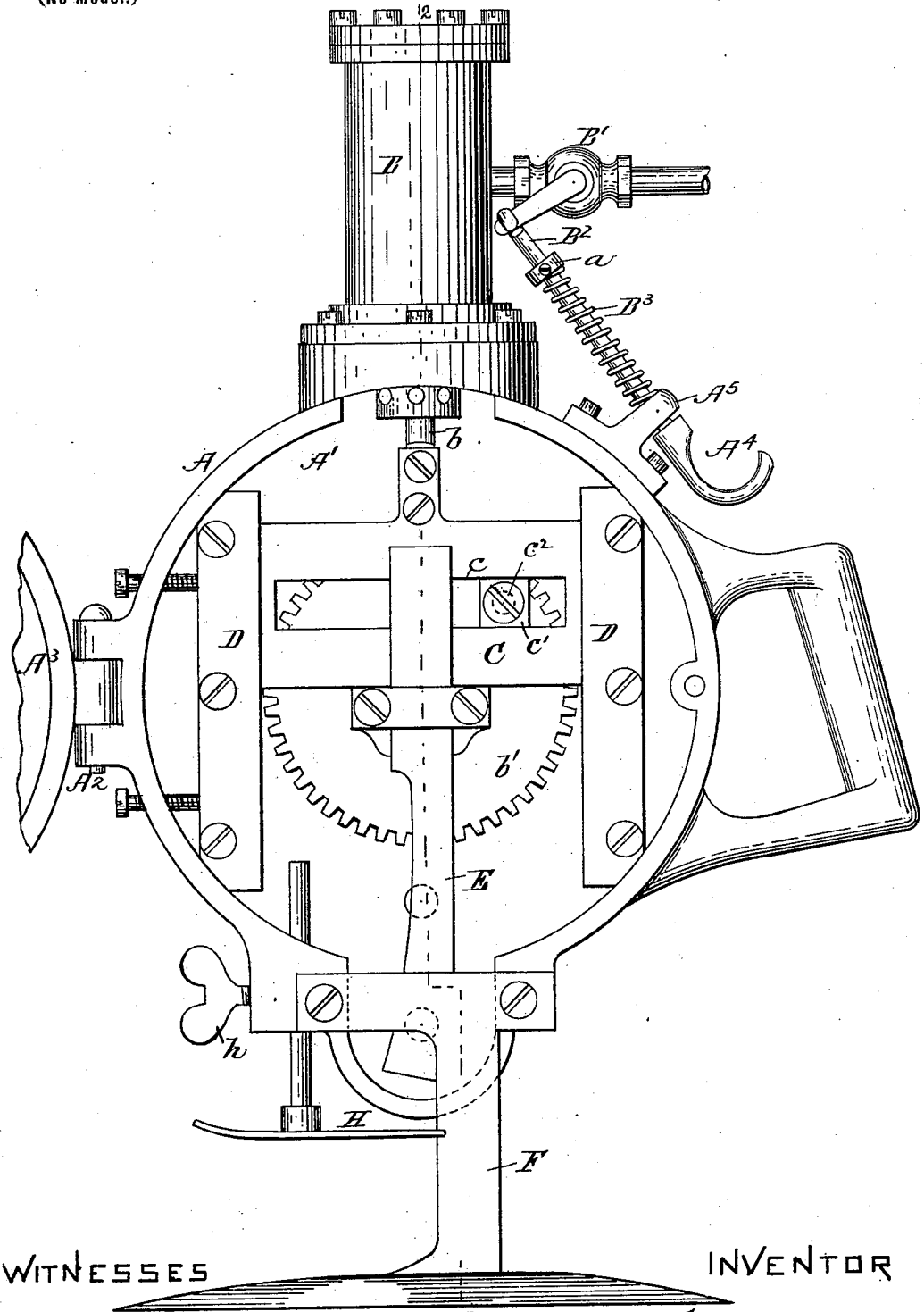
Figure 2:
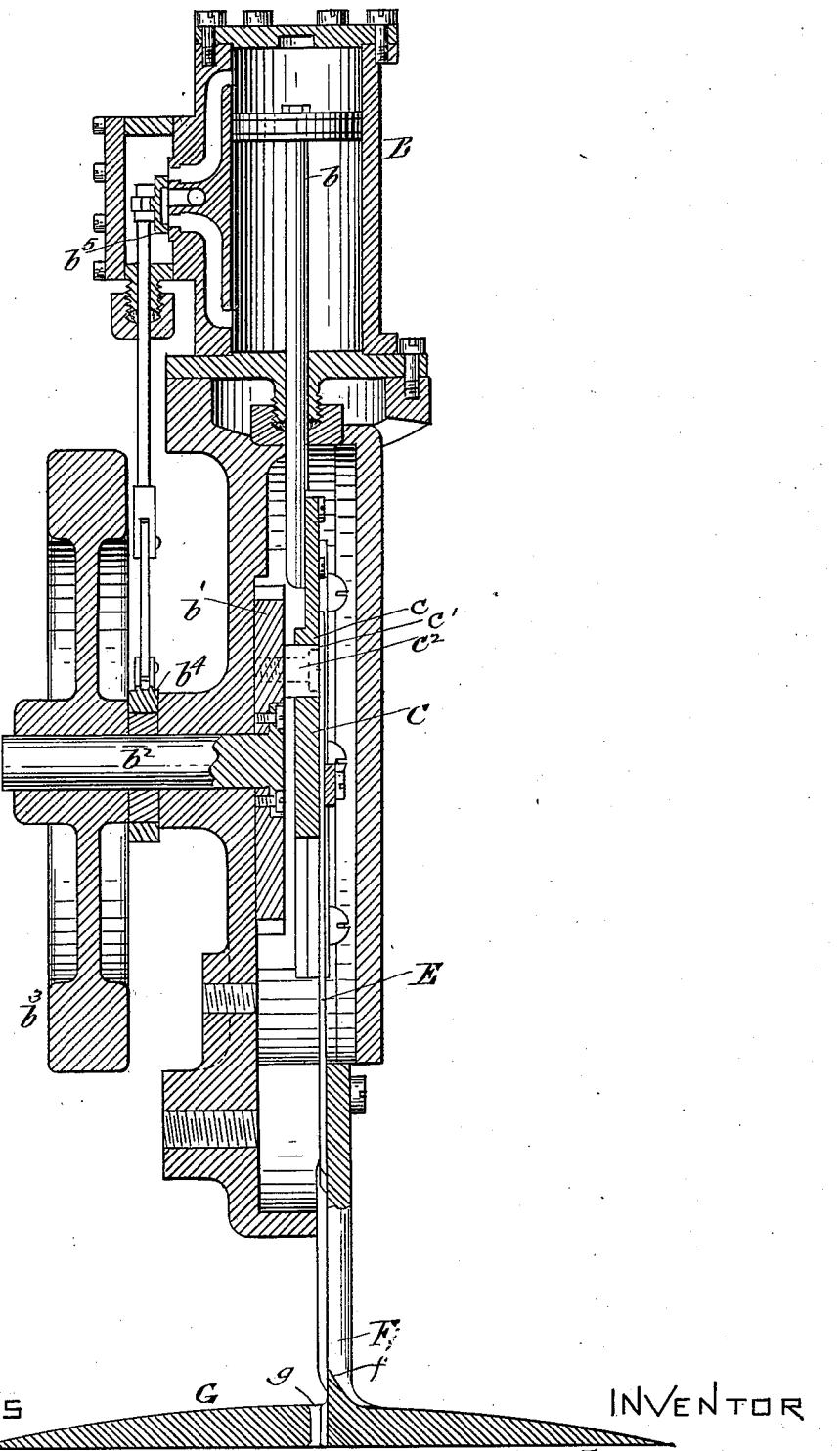

Figure 1 is a side elevation of a machine embodying my invention, the door or cover being opened, Fig. 2 being a vertical section on line 2 2 of Fig. 1, Fig. 3 a side elevation of a modification.

I prefer to support my mechanism in a casing having a cylindrical wall A and a back A'. At one side of this casing is one member of a hinge $A^2$, to which is hinged a door $A^3$, (partly broken away,) which closes the front of the cylinder, inclosing the interior from dust, &c. On top of the casing is mounted a cylinder B, containing a piston, the rod $b$ of which passes downward within the casing through a suitable opening and is therein connected with a cross-head C, mounted to slide in ways D. These ways are located one on each side of the interior of the casing, and hence the bearings of said cross-head are located at a considerable distance from the middle portion thereof, to which the knife-blade is attached. To the cross-head is attached a knife-blade E, the lower edge of which is sharpened, preferably, on an angle, as shown, in order to make a shear cut with the stationary blade $f$, forming part of the standard F. The cross-head C is provided with horizontal slide ways $c$, in which slides a block $c'$, carried on a crank-pin $c^2$, attached to a disk $b'$. This disk $b'$ is mounted on the end of a short shaft $b^2$, passing out through the center of the back of the casing and carrying at its outer end a balance-wheel $b^3$. An eccentric $b^4$ is also mounted upon the shaft $b^2$ and is connected to a valve-motion $b^5$ of ordinary construction to control the inlet and exhaust opening in the cylinder B. The casing is mounted upon a stand having for convenience a broad bottom or foot G, being connected thereto by a standard F, which serves not only as a support for the casing, but also as the lower member of the shears and also as a guide for the knife-blade, where it passes out of the casing. At one side of the lower edge of this knife is an opening $g$ in the foot G sufficiently large to receive the end of the movable knife E, and the lower portion of the stationary knife F is shaped as shown, the upper edge of its projecting toe $f$ being ground to form with the lower end of the movable blade a pair of shears. It will be noted that the knife E runs in a groove upon one side of the standard F, so that its rear edge and narrow portion only of one side of the knife has a bearing against the standard F. By this means also any great amount of frictional heat is avoided, and the danger of drawing the temperature of the knife is reduced materially. Such a machine as I have described is capable of running at a speed of from one thousand to twelve hundred strokes a minute, and hence the liability of developing a high degree of frictional heat is great, and the necessity for using every precaution against such development is apparent. I also prefer to provide an adjustable presser-foot H, which is held in an opening in the wall A by a set-screw $h$ and is lowered upon the cloth and without binding it holds it against the upward draft of the movable knife.

I prefer to provide my cutter with compressed air as a motive power rather than steam, for the reason that steam not only heats the machine, but also because the condensation must be taken care of in such a way as not to injure the cloth by the drip or hamper the cutter any more than is necessary in its movements about the table. For this purpose I provide a stop-cock B', attached to one side of the valve-chest and preferably constructed to be operated by means of a rod $B^2$, carried down to the handle $A^4$ (by means of which the operator moves the cutter) and guided by the eye $A^5$ on the side of the casing. This rod $B^2$ is preferably controlled by a spring $B^3$, lying between the eye $A^5$ and a collar $a$ on the rod $B^2$, so that the stop-cock is normally closed, the operator opening it and holding it open during such time as he wishes the knife to be operative.

The operation of my machine as thus described is as follows: A pile of cloth of the desired thickness having been prepared and the presser-foot having been so lowered as to rest upon the pile of cloth, the operator pulls the rod $B^2$ to open the stop-cock B', thus causing air from the compressor to enter the valve-chest, and the reciprocation of the piston causes the reciprocation of the knife through the intermediate mechanism. The operator pushes the cutter into the cloth, and owing to its flexible connection with the air-supply he is enabled to move the cutter in any direction. Thus it can be rapidly turned to meet the demands of any pattern of ordinary character, so that a large number of pieces of the same pattern may be cut out at once and with great accuracy.

Instead of a vertically-moving knife a rotary knife is sometimes preferred for light work, and in Fig. 3 I show a modification in which a rotary knife is used. In this case the periphery of the disk $b'$ is provided with teeth $j$, which mesh with corresponding teeth in an intermediate gear J, journaled on a stud $j'$, set into the back A' of the casing. J' is a third gear mounted on a shaft $J^2$, suitably supported in a bearing on the under side of the casing, which shaft also carries the disk-knife $J^3$. In this case the piston-rod in moving the cross-head C and the disk $b'$ causes by this means the operation of the disk-knife $J^3$. A foot G is provided, slotted slightly to receive the lower edge of the knife, the foot being supported in this case by an arm F', depending from the casing A. It is evident that this modification may be very simply and readily applied to a machine having a reciprocating knife, the knife being removed from the cross-head, the disk $b'$ being supplied in any case with gear-teeth about its periphery, and the intermediate gear being placed upon the stud $j'$ and the frame carrying the shaft $J^2$, gear J', and disk-knife $J^3$, which all may be part of the arm F', being substituted for the standard F and its foot G.

The simplicity of this construction will recommend it to those skilled in the art, and its utility may be easily perceived. As it is not complicated in any way, it is not liable to get out of order, and if it does it may be easily repaired by any mechanic. I prefer to make one of the vertical slides for the cross-head adjustable to take up the wear therein.

What I claim as my invention is—

In a cloth-cutting machine a cylinder, a piston, a cross-head attached to said piston, said cross-head being provided with means for connecting a knife thereto to reciprocate therewith, said cross-head being provided with a slot, in combination with a rotary gear carrying a cam-pin adapted to reciprocate in said slot, and said casing being provided with a bearing for a rotary knife, in combination with means connecting said rotary knife with said gear whereby said machine may be rendered convertible from a rotary cutting-machine to a reciprocating cutting-machine, as described.

In testimony whereof I hereunto set my name this 23d day of August, 1901.

FRANK DODGE.

Witnesses:
GEORGE O. G. COALE,
M. E. FLAHERTY.